UNITED STATES PATENT OFFICE.

GEORGE IVIS STEVENS, OF ESSEX, CONNECTICUT.

METAL-POLISH.

No. 885,542.     Specification of Letters Patent.     Patented April 21, 1908.

Application filed May 7, 1907. Serial No. 372,308.

*To all whom it may concern:*

Be it known that I, GEORGE IVIS STEVENS, a citizen of the United States, residing at Essex, in the county of Middlesex and State of Connecticut, have invented certain new and useful Improvements in Metal-Polishes; and I do hereby declare the following to be a full, clear, and exact description of the invention, such as will enable others skilled in the art to which it appertains to make and use same.

This invention relates to new and useful improvements in metal polishes and the object of the invention is to produce a polish having properties which render the same fire-proof at any atmospheric temperature and producing, by the addition of certain proportions of one of the ingredients, a polish which will serve as a fire extinguisher and in no way destroying the efficiency of the material as a polish.

My metal polish comprises the following ingredients: to four gallons of naphtha are added three and a half gallons of carbon tetra chlorid, six pounds of red oil or stearic acid, two pounds of aqua ammonia of 26 degrees as an alkali which are thoroughly stirred in a steam mixer and, when all of the parts are thoroughly mixed, the material is of the consistency of a finished soft soap, after which nineteen pounds of silica are added thereto and agitated in a steam mixer.

By the employment of more or less of the naphtha and carbon tetra chlorid acting as a solvent, my metal polish may be reduced to any desired consistency either as a paste or, by adding more of the solvent, may be thinned and to the mixture may be added any other scouring material in place of the silica, such as tripoli, powdered stone or whitening. In compounding the material, in substantially the parts set forth, is put into a mixer and thoroughly mixed.

Metal polishes have been heretofore more or less unsatisfactory requiring much labor and time and apt to fire at a low temperature, whereas my composition produces a liquid or paste polish as proportions are varied, which will produce a brilliant surface in less time and with less labor than polishes heretofore employed and, at the same time, be uninflammable at any atmospheric temperature and, by increasing the quantity of the non-inflammable solvent, the composition will act as a fire extinguisher.

I have found that, when the ingredients are compounded in the manner set forth, the composition will be of such a consistency that none of the ingredients will settle to such an extent as to harden upon the bottom of a receptacle in which the material is stored.

What I claim to be new is:—

A non-inflammable liquid polish consisting of ammonium oleate, aqua ammonia, silica, naphtha, and carbon tetra chlorid in the proportions herein set forth.

In testimony whereof I hereunto affix my signature in the presence of two witnesses.

GEORGE IVIS STEVENS.

Witnesses:
   C. PHILIP DICKINSON,
   P. M. STEVENS.